United States Patent
Davidson-Sokal et al.

(10) Patent No.: US 7,536,053 B2
(45) Date of Patent: May 19, 2009

(54) METHOD AND APPARATUS FOR THE CORRECTION OF NONLINEAR FIELD OF VIEW DISTORTION OF A DIGITAL IMAGING SYSTEM

(75) Inventors: Carl Davidson-Sokal, Rochester, NY (US); Scott Davis, Dublin, CA (US)

(73) Assignee: Quality Vision International, Inc., Rochester, NY (US)

( * ) Notice: Subject to any disclaimer, the term of this patent is extended or adjusted under 35 U.S.C. 154(b) by 996 days.

(21) Appl. No.: 10/974,645

(22) Filed: Oct. 27, 2004

(65) Prior Publication Data

US 2006/0087645 A1   Apr. 27, 2006

(51) Int. Cl.
*G06K 9/68* (2006.01)
(52) U.S. Cl. .................. 382/218; 382/100; 382/255; 382/286
(58) Field of Classification Search .............. 382/218, 382/100, 255, 286
See application file for complete search history.

(56) References Cited

U.S. PATENT DOCUMENTS

| | | | |
|---|---|---|---|
| 4,256,364 A | 3/1981 | Minoura et al. | |
| 4,298,944 A | 11/1981 | Stoub et al. | |
| 4,825,394 A | 4/1989 | Beamish et al. | |
| 5,070,401 A | 12/1991 | Salvati et al. | |
| 6,026,172 A | 2/2000 | Lewis, Jr. et al. | |
| 6,538,691 B1 | 3/2003 | Macy et al. | |
| 6,567,570 B1 | 5/2003 | Steinle et al. | |
| 6,573,986 B2 | 6/2003 | Smith et al. | |
| 6,618,494 B1 | 9/2003 | Nonay et al. | |
| 6,707,998 B2 | 3/2004 | Gallagher | |
| 6,816,625 B2 | 11/2004 | Lewis, Jr. et al. | |
| 6,819,789 B1 * | 11/2004 | Kantor et al. | 382/151 |
| 7,146,033 B2 | 12/2006 | Brinker et al. | |
| 2002/0041383 A1 | 4/2002 | Lewis, Jr. et al. | |
| 2002/0141636 A1 | 10/2002 | Wakamoto et al. | |
| 2002/0164083 A1 | 11/2002 | Song et al. | |
| 2003/0038933 A1 | 2/2003 | Shirley et al. | |
| 2003/0048436 A1 | 3/2003 | Kitabayashi et al. | |
| 2003/0118227 A1 | 6/2003 | Winsor et al. | |

(Continued)

OTHER PUBLICATIONS

Janez Perš, Stanislav Kovačič, "Nonparametric, Model-Based Radial Lens Distortion Correction Using Tilted Camera Assumption", Workshop, Feb. 7, 2002, 10 pages, University of Ljubljana, Tržaška, Slovenia.

(Continued)

*Primary Examiner*—Matthew C Bella
*Assistant Examiner*—Mike Rahmjoo
(74) *Attorney, Agent, or Firm*—Thomas B. Ryan; Stephen B. Salai, Esq.; Harter Secrest & Emery LLP

(57) ABSTRACT

Nonlinear distortions of imaging optics within a computer vision system are quantified as corrective values within a viewing window defined by a pixel array. A test artifact is displaced within an object plane through increments of measured distances and the corresponding displacements of the test artifact within an image plane are recorded within the pixel array. Comparisons are made between the actual appearances of the test artifact within the image plane and predicted appearances of the test artifact within the image plane based on the measured displacements in the object plane for determining the corrective values.

26 Claims, 4 Drawing Sheets

U.S. PATENT DOCUMENTS

2007/0229665 A1  10/2007  Tobiason et al.

OTHER PUBLICATIONS

Tsai, Roger Y, "A Versatile Camera Calibration Technique for High-Accuracy 3D Machine Vision Metrology Using Off-the-Shelf TV Cameras and Lenses"; IEEE Journal of Robotics and Automation, vol. RA-3, No. 4, Aug. 1987, pp. 323-344.

Reimann, David A. and Flynn, Michael J., "Automated Distortion Correction of X-Ray Image Intensifier Images", Nuclear Science Symposium and Medical Imaging Conference, 1992., Conference Record of the 1992 IEEE Orlando, FL, USA Oct. 25-31, 1992, New York, NY USA, IEEE, US, Oct. 25, 1992, pp. 1339-1341.

Zhengyou, Zhang, "Camera Calibration with One-Dimensional Objects" IEEE Transactions on Pattern Analysis and Machine Intelligence, IEEE, New York, NY, US, vol. 26, No. 7, Jul. 2004, pp. 892-899.

European Patent Office Search Report, Application No. 05256444.0, Date Mailed Mar. 19, 2007.

McFawn, P.K., Forkert. L., Fisher, J.T. "A new method to perform quantitative measurements of bronchoscopic images"; Eur Respir J 2001; 18: 817-826, Copyright European Respiratory Journal, Copyright 2001, pp. 817-826.

* cited by examiner

METHOD AND APPARATUS FOR THE CORRECTION OF NONLINEAR FIELD OF VIEW DISTORTION OF A DIGITAL IMAGING SYSTEM

BACKGROUND OF THE INVENTION

1. Field of the Invention

Computer vision applications involving digital optical metrology provide for precisely imaging test pieces for purposes of measurement or comparison. Calibration techniques accommodate imaging system errors.

2. Description of Related Art

Nonlinear field of view distortions are particularly troublesome for computer vision applications that require precise measurements or comparisons of imaged test objects. The distortions do not affect image quality, such as the sharpness of the image, but do affect image geometry, which can complicate the accurate determination of size, shape, and location of the imaged test objects.

For example, curvilinear distortions are manifest as so-called "barrel" or "pincushion" distortions. Focal length varies as a function of radial distance from a center of the field. Straight tangential lines tend to curve, while radial lines remain straight. "Barrel" distortion decreases focal length as the field angle increases, and "pin cushion" distortion increases focal length as the field angle increases. Other distortions in which the resulting image is not a true-to-scale reproduction of an object include radial distortion in which magnification varies from the center of the field, anamorphic distortions in which magnification varies with direction, and tangential distortions such as resulting from centration errors.

Among the most significant problems caused by such nonlinear field of view distortions for the imaging of test objects are size, shape, and location distortions. The same test object can appear to be differently sized or shaped depending upon its position within the field of view. The apparent distance an object moves within the field of view can differ from the actual distance that the object moves. For example, the location of an object's edge from the center of the field of view can differ from the actual location of the object's edge depending upon such factors as the position and orientation of the object's edge within the field of view.

Solutions for measuring and correcting for such nonlinear field of view distortions include the use of calibrated artifacts having known size and shape. The calibrated artifacts are moved to different locations within the field of view and deviations in the measured size and shape are used to generate local error corrections within the field of view. For digital cameras, lookup tables are created for recording pixel-by-pixel corrections.

Another technique for compensating for nonlinear field of view distortions involves placing a calibrated grid within the field of view. Typically, the calibrated grid fills the entire field of view, and the imaged locations of the grid lines are compared to their known locations to generate corrections required for constructing a more accurate image of the calibrated grid.

The manufacture and certification of calibrated artifacts and grids involves considerable expense. The accuracy with which the calibrated artifacts are known affects the accuracy of the corrections that can be made to compensate for the distortions of the field of view. Multiple artifacts and grids are sometimes needed for measuring distortions of the field of view at different magnifications.

BRIEF SUMMARY OF THE INVENTION

The invention is particularly applicable to computer vision systems of the type that include a digital imaging system in combination with a motion stage for relatively moving test artifacts within the field of view of the digital imaging system. In one or more of the preferred embodiments, the digital imaging system and motion stage provide separate measurements of the test artifacts. The digital imaging system can be associated with image processing capabilities for monitoring the location of test artifacts or their features within the field of view, and the motion stage can be associated with instrumentation for measuring relative displacements of the test artifacts imparted by the motion stage. Distortion related error corrections can be determined by comparing displacements of images of the test artifact within the field of view with the measured displacements the motion stage.

For example, a test artifact can be placed on the motion stage and moved by steps through the field of view. The artifact displacements can be recorded in both image space and object space, and a comparison can be made between the two. The digital imaging system preferably detects displacements of the test artifact in image space, and instrumentation associated with the motion stage preferably detects displacements of the test artifact in object space. Differences between scaled measures of displacement in image and object spaces can be attributed to errors in the imaging system when accuracy and repeatability of the motion stage instrumentation are significantly smaller than the detected error.

The test artifact can be a simple structure of undetermined size, but preferably has one or more edges that can be clearly imaged by the imaging system. For example, the calibration artifact can have two orthogonally related edges. One of the edges preferably spans one entire dimension of the field of view at the lowest working magnification of the imaging system, and the other of the edges preferably spans an orthogonal dimension of the field of view at the same working magnification. Both edges are preferably straight, but allowances can be made for variations in form, orthogonal tilt, and perpendicularity.

Within a vertical (Y axis) and horizontal (X axis) coordinate system corresponding to both (a) vertical and horizontal dimensions of the image field and (b) coordinate directions of motion imparted by the motion stage, the edges of the reticle can be approximately aligned for rectilinear motion. For example, a vertical edge can be aligned with the Y-axis, and a horizontal edge can be aligned with the X-axis. The vertical edge spanning the entire Y axis coordinate dimension of the image field can be stepped by known increments in the X coordinate dimension, and the horizontal edge spanning the entire X axis coordinate dimension of the image field can be separately stepped by known increments in the Y coordinate dimension. The successive locations of the edges can be measured in the field of view (image space) in units of image pixels. The same displacements can be measured in units of distance by the motion stage. Absent any misalignment or departures from straightness of the edges, all points along the two edges should undergo similar amounts of displacement in units of image pixels for each step that the edges are actually displaced in their respective directions. After resolving any issues of edge misalignment or departures from straightness, deviations in the amount of displacement of the edges measured in units of pixels can be attributed to distortions of the field of view.

For example, after determining where the vertical and horizontal edges appear in the image space at the incrementally displaced positions, a comparison can be made against where the edges should have appeared based upon the known increments of displacement. Each of the pixels within the field of view can be associated with a correction in the vertical and horizontal directions for reproducing a digital image corrected for the measured distortions.

An embodiment of the invention as a method of quantifying nonlinear field of view distortions in a digital imaging system includes mounting a test artifact in a position for undergoing relative motion with respect to a digital imaging system that optically images the test artifact. The relative motion of the test artifact through a field of view of the digital imaging system is monitored in two ways. First, the location of the test artifact appearing within an image space of the digital imaging system is monitored. Second, the location of the test artifact within an object space of the digital imaging system is monitored as a measure of the relative motion imparted to the test artifact. Comparing changes in the monitored location of the test artifact appearing in the image space with changes in the monitored location of the test artifact in the object space enables nonlinear field of view distortions to be quantified for the digital imaging system.

Another embodiment of the invention as method of compensating for non-linear distortion of a computer vision system combines a digital imaging system with a motion stage. A test artifact having an imageable feature is positioned within a field of view of the digital imaging system. The motion stage relatively moves the test artifact together with the imageable feature with respect to the digital imaging system through a succession of different positions within the field of view of the digital imaging system. Noted at each position are (a) a location of an image of the imageable feature within the digital imaging system as a set of pixels within a pixel array and (b) a location of the imageable feature with respect to the digital imaging system as a relatively displaced position in coordinate space. Predicted locations of the image of the imageable feature are calculated based on the relative location of the imageable feature with respect to the digital imaging system in coordinate space. Corrections to the field of view are then determined based on differences between the predicted locations of the image of the imageable feature and the noted locations of the image of the imageable feature.

Another embodiment of the invention as method of determining distortions in a vision system also combines a digital imaging system with a motion stage. An orientation of an artifact feature is separately measured with respect to the digital imaging system and the motion stage. The artifact feature is relatively stepped with respect to the digital imaging system through a succession of positions within a field of view of the digital imaging system. Associated changes in the positions of the artifact feature with respect to the digital imaging system are also measured. Appearances of the artifact feature within the digital imaging system are recorded at each of the succession of positions. Predicted appearances of the artifact feature within the digital imaging system are calculated based on: (a) the measure of the orientation of the artifact feature with respect to the digital imaging system, (b) the measure of the orientation of the artifact feature with respect to the motion stage, and (c) the measure of the change in position of the artifact feature with respect to the digital imaging system. Distortions in the digital imaging system are then determined based on differences between the recorded appearances of the artifact feature within the digital imaging system and the predicted appearances of the artifact feature within the digital imaging system.

Yet another embodiment of the invention as a system for compensating for non-linear field of view distortions in a computer vision system includes a digital imaging system having a set of optics for imaging an artifact feature within a field of view and a motion stage for relatively moving the artifact feature with respect to the digital imaging system. A controller associated with the motion stage relatively moves the artifact feature with respect to the digital imaging system through a succession of different positions. Instrumentation associated with the motion stage measures the relative displacement of the artifact feature with respect to the digital imaging system through the succession of different positions. A processor (a) records locations of a succession of images of the artifact feature within the field of view at the succession of different relative positions of the artifact feature, (b) calculates predicted locations of the images of the artifact feature based on the measured relative displacement of the artifact feature, and (c) compares the recorded locations of the succession of images of the artifact feature within the field of view with the predicted locations of the images of the artifact feature within the field of view for determining corrections required to compensate for non-linear field of view distortions.

The invention among its embodiments obviates the need for a calibrated test artifact or test grid. In fact, the preferred test artifact for the invention has an undetermined size or a size that, even if known to some accuracy, is not relied upon to quantify imaging system distortions. The preferred test artifact also has a simple shape, such as a square with two right angle edges that participate in the characterization of image distortions. Each of the two edges preferably bisects one of two orthogonal dimensions of the field of view so that information concerning distortions in the two dimensions can be collected efficiently.

BRIEF DESCRIPTION OF THE SEVERAL VIEWS OF THE DRAWING(S)

FIG. 1 shows the layout of computer vision system in a side view with a test artifact mounted on a motion stage within view of a digital imaging system for quantifying nonlinear field of view distortions in the digital imaging system.

FIG. 2 overlays a square test artifact over a field of view sampled by a detector array.

DETAILED DESCRIPTION OF THE INVENTION

Figure 1:
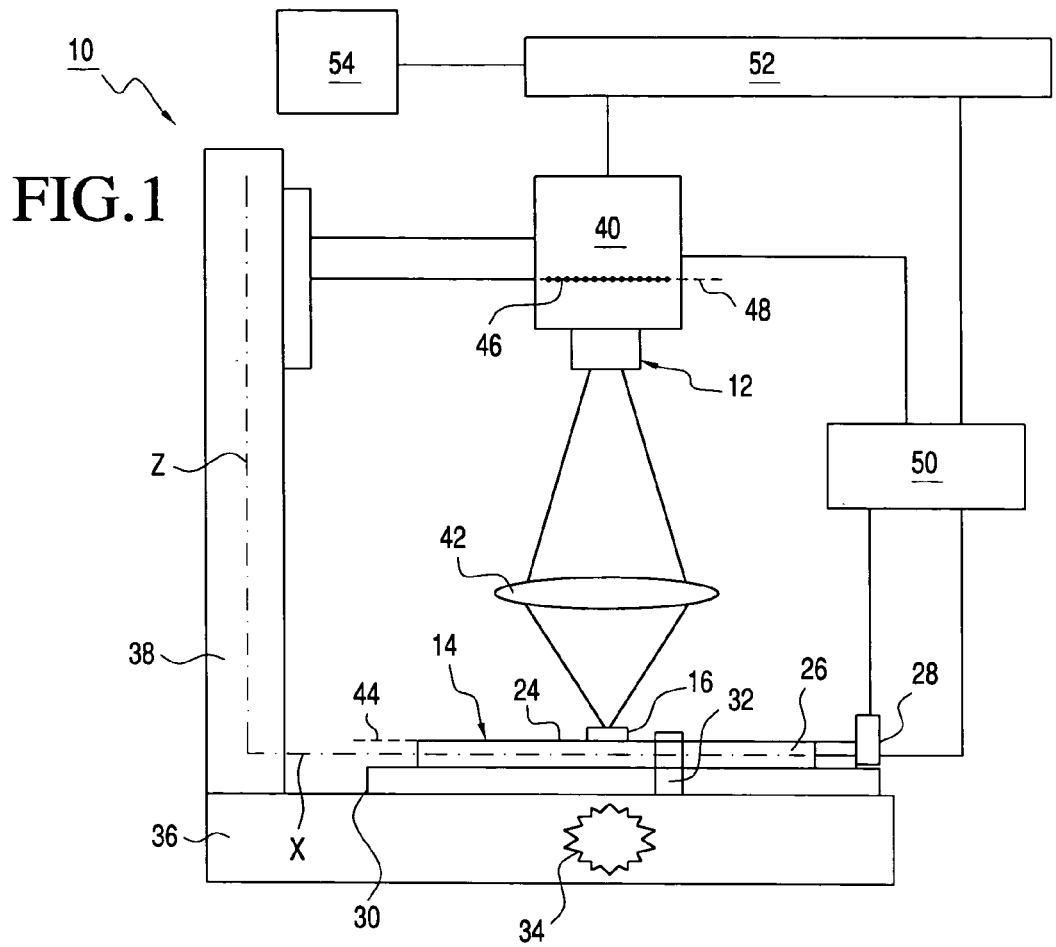
Figure 2:
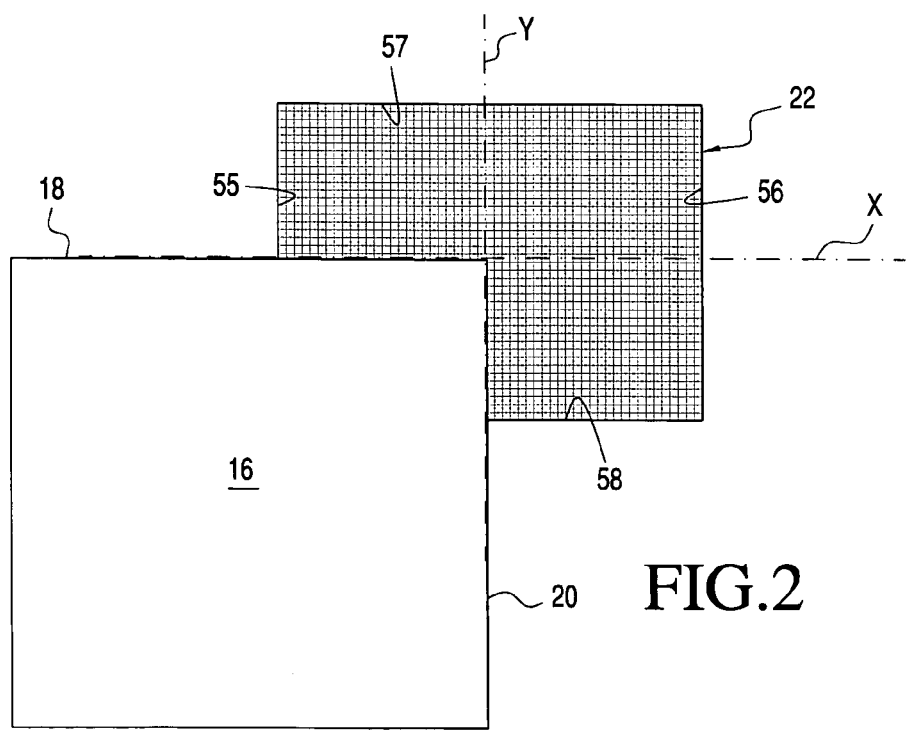

A computer vision system 10 of a type subject to the improvements of the invention as shown in FIG. 1 includes a digital imaging system 12 and a motion stage 14 for relatively moving a test artifact 16 through a field of view of the digital imaging system 12. The test artifact 16 as shown in FIG. 2 is an alignment reticle in the form of a chrome square with two edges 18 and 20 that are perpendicular to each other and of substantial straightness. The horizontal edge 18 (as shown in the plane of FIG. 2) is approximately aligned with an X coordinate axis of a video window 22 of the digital imaging system 12, and the vertical edge 20 (also as shown in the plane of FIG. 2) is approximately aligned with a Y coordinate axis of the video window 22. Although it is not necessary to know the exact size of the square artifact 16, the square artifact 16 is preferably large enough to completely bisect the video window 22 along both the X and Y coordinate axes at the lowest magnification of the digital imaging system 12.

The motion stage 14 includes a mounting surface 24 for mounting the square artifact 16 and provides two axes of motion for the square artifact 16 aligned with the X and Y coordinate axes of the video window 22. A first translation stage 26 moves the square artifact 16 along the X coordinate axis under the control of a first drive 28 that is instrumented to provide position feedback information for measuring motion of the stage 26 along the X coordinate axis. A second translation stage 30 moves the square artifact 16 along the Y coordinate axis under the control of a second drive 32 that is instrumented to provide position feedback information for measuring motion of the stage 30 along the Y coordinate axis. A light source 34 within a base 36 supporting the translation stages 26 and 30 illuminates the mounting surface 24 through light transmitting portions of the translation stages 26 and 30, allowing the edges 18 and 20 of the square artifact 16 to be brought into sharp focus by the digital imaging system 12.

The digital imaging system 12 includes a digital camera 40 cantilevered from a pedestal 38 that extends above the base 36 along with a similarly supported objective lens 42 for imaging illuminated edges of the square artifact 16 in an object plane 44 onto a detector pixel array 46 in an image plane 48 within the digital camera 40. The detector pixel array 46 corresponds in size to the video window 22 and sets limits of a field of view for a given magnification of the square artifact 16 in the object plane 44. Resolution is determined in part by the number of pixels in the array, which can number 640 by 480 for example. The digital camera 40 can be translated along a Z-axis of the pedestal 38 for achieving the desired focusing objectives.

A controller 50 under the instruction of a computer processor 52 controls operation of the motion stage 14 providing desired translations of the square artifact 16 through a succession of positions along the two coordinate axes X and Y. The associated instrumentation of the coordinate axes X and Y provides position feedback information that can be used for better controlling the movements of the stages 26 and 30 and for relating movements of the test artifact 16 in the object plane 44 to the apparent movements of the test artifact 16 in the image plane 48.

The processor 52 provides a number of functions including (a) recording locations of artifact edges 18 and 20 within the image plane at a succession of displaced positions of the artifact 16 within the object plane 48, (b) predicting locations of the artifact edges 18 and 20 within the image plane 48 based on the measured displacements of the artifact within the object plane 44, and (c) comparing the recorded locations of the artifact edges 18 and 20 within the image plane to the predicted locations of the artifact edges 18 and 20 within the image plane for determining corrections required to compensate for nonlinear field of view distortions of the digital imaging system 12. The error corrections can be recorded in a lookup table for the pixels subject to measurement. Interpolation techniques can be used for making error corrections for the remaining pixels.

Figure 3:
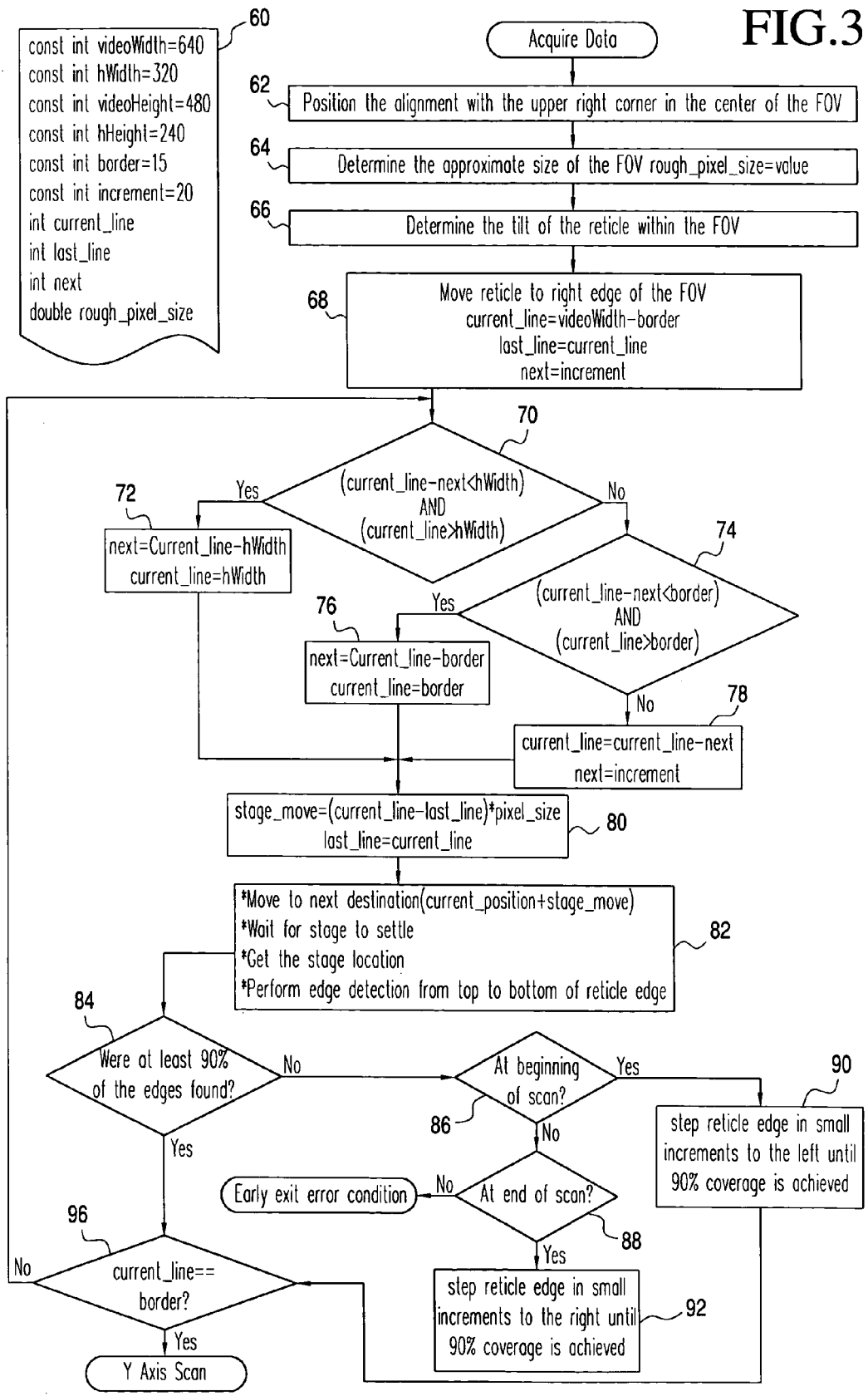
FIG. 3 is a flow chart describing a first part of a data acquisition system including data relating to displacements of the test artifact along a first coordinate axis.
Figure 4:
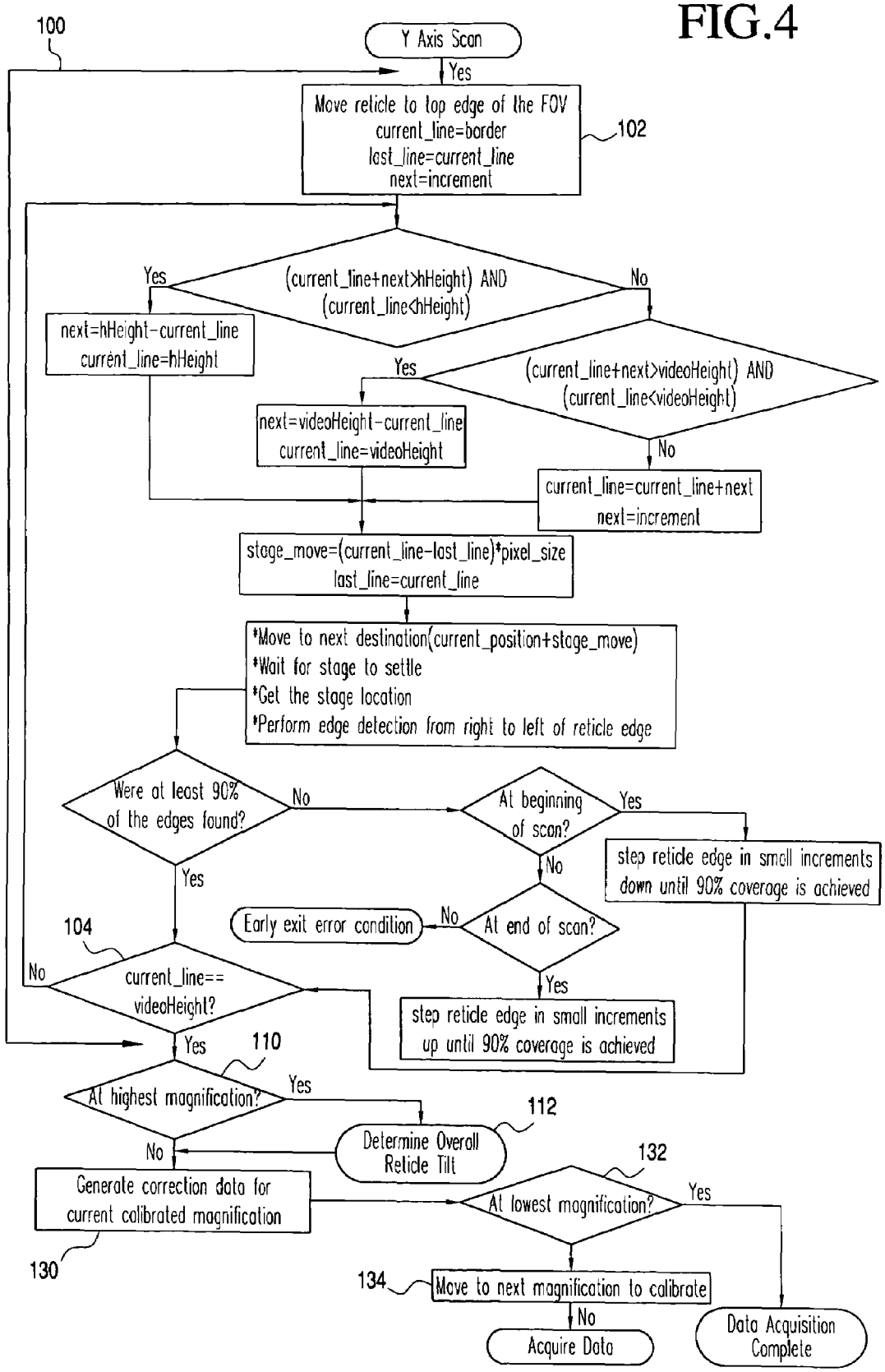
FIG. 4 is a flow chart describing a second part of a data acquisition system including data relating to displacements of the test artifact along a second coordinate axis.
Figure 5:
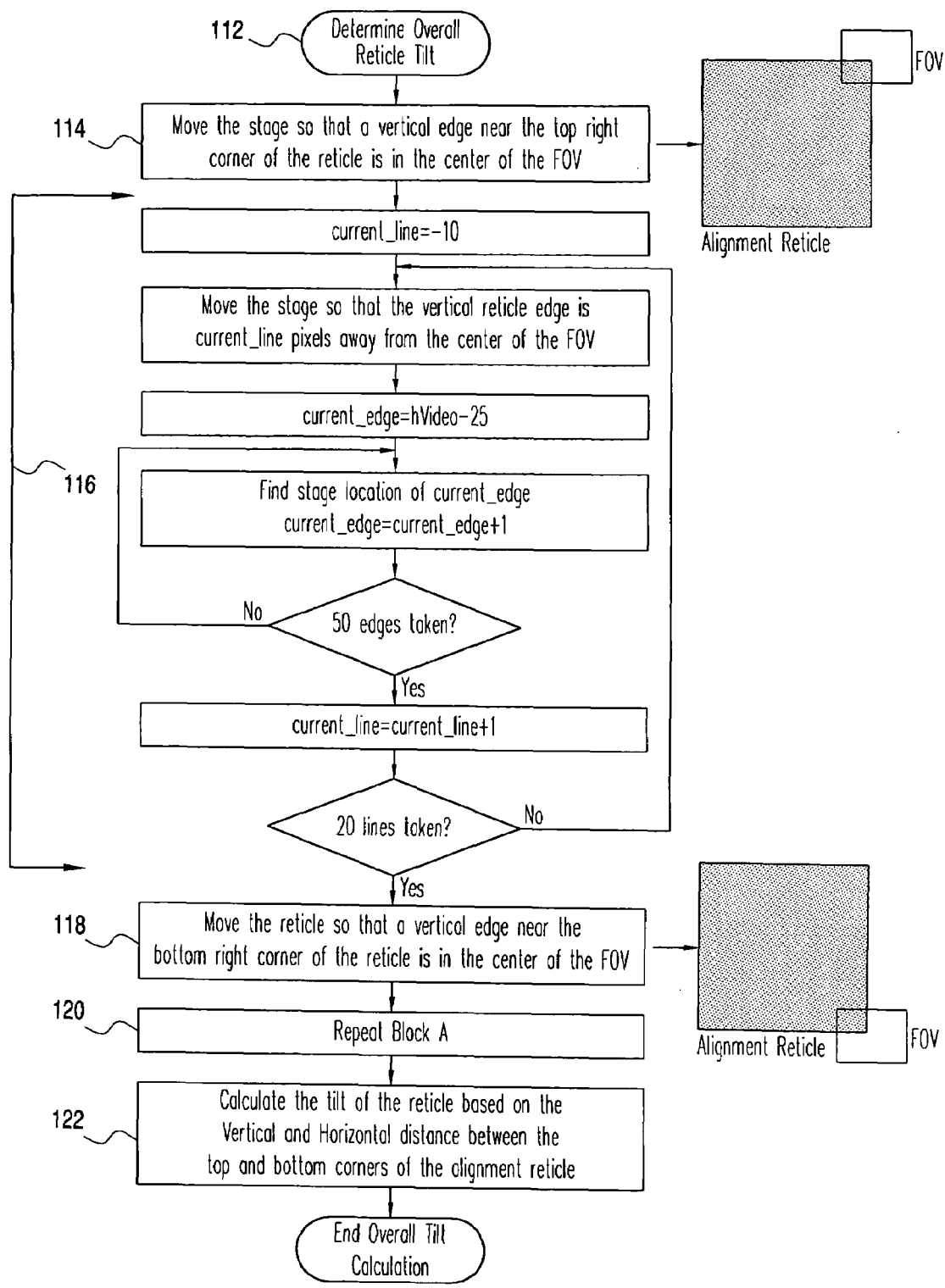
FIG. 5 is a flow chart describing a process for determining tilt of the test artifact with respect to the two coordinate axes.

Flow charts describing an example of the type of operations performed within the processor 52 are presented in FIGS. 3-5. A first part of a data acquisition routine is described by FIG. 3, beginning with an initialization step 60 that set the bounds of the detector pixel array 40, which includes by way of example a matrix of 640 pixels along the X coordinate axis and 480 pixels along the Y coordinate axis. The square test artifact 16, which is referred to as an "alignment reticle", is positioned at step 62 with its upper right corner formed by the intersection of edges 18 and 20 within the center of the field of view as shown in FIG. 2. A video display 54 connected to the computer processor 52 includes graphics for guiding the square artifact 16 to the desired position within the field of view.

Step 64 determines the approximate pixel size in the two coordinate directions along with approximate dimensions of the pixel array. The motion stage displaces the edges 18 and 20 by measured amounts along the two coordinate axis X and Y, and the corresponding displacements in pixels are measured along limited regions of the two edges 18 and 20. The field of view can be approximated from a previously performed and saved simple (linear) calibration done on the instrument, or the field of view can be approximated from a nominal magnification value for the optical components being used (i.e., from the optical specifications). Step 66 determines the approximate tilt of the two edges 18 and 20 with respect to the X and Y coordinate axes. For measuring the tilt of the horizontal edge 18 with respect to the X coordinate axis, the edge 18 is moved to a position that horizontally bisects the field of view within the video window 22. Pixel displacements of the edge 18 along the Y coordinate axis near the opposite side borders 55 and 56 of the video window 22 are compared to the pixel distance between the measured displacements to estimate the tilt of edge 18. The tilt of the vertical edge 20 is similarly estimated with respect to the Y coordinate axis by moving the edge 20 to a position that vertically bisects the field of view within the video window 22 and measuring relative displacements of the edge 20 near the top and bottom borders 57 and 58 of the video window 22.

Based on these preliminary measurements, enough information has been collected to begin acquiring data relating to the appearance of the edges 18 and 20 at incrementally shifted positions throughout the field of view. Step 68 starts a sequence for recording incrementally displaced positions of the vertical edge 20 beginning near one side border 56 of the video window 22. Decision step 70 checks if the vertical edge 20 is approaching the center of the field of view, and if so, a regular incremental displacement of the edge 20 is modified by step 72 so that the edge 20 is displaced by equal amounts on opposite sides of the center of the field of view. Decision step 74 checks if the vertical edge 40 is approaching the opposite side border 55 of the video window 22, and if so, the step 76 does not allow the vertical edge 40 to be moved beyond the border 55. Otherwise step 78 supports a regular incremental displacement of the vertical edge 20 across the field of view.

Step 80 calculates instructions for the controller 50 for carrying out the displacements determined in the preceding steps. The units of pixel displacements are converted into stage motions using the estimates of pixel size also determined in the preceding steps. Actual data gathering occurs at step 82. After moving the translation stage 26 to the next determined position and waiting for the translation stage 26 to settle, the stage location is retrieved and a conventional edge detection procedure, referred to as a weak edge algorithm, is applied to identify the pixels along which the vertical edge 20 is found.

Decision step 84 queries whether enough of the vertical edge 20 has been identified. Identification of at least 90 percent of the edge is preferred for taking a measurement. Near the borders 55 and 56, the tilt of the edge 20 can reduce the number of pixels straddling a point along the edge below a threshold for the processing algorithm. If at least 90 percent of the vertical edge 20 is not detected, decision steps 86 and 88 check to be sure the vertical edge 20 is near one of the two horizontal borders 55 or 56, because otherwise an error condition exists. Steps 90 and 92 move the vertical edge 20 by small increments away from the borders 55 or 56 until at least 90 percent of the edge is detected. Decision step 96 returns processing to the decision step 70 for displacing the vertical edge 20 through another incremental displacement unless the vertical edge 20 has arrived at the opposite border 55 completing the scan.

A second part of the data acquisition routine is described by the flow chart of FIG. 4. Block 100 of the flow chart bordered by steps 102 and 104 follows a sequence corresponding to the steps 68 through 96 in the first part of the data acquisition routine adapted for using the horizontal edge 18 for scanning the field of view along the Y coordinate axis. At each measured incremental displacement of the horizontal edge 18, both the location of the motion stage 14 and the locations of the pixels along which the edge 18 is found are recorded.

Decision step 110 determines if the digital imaging system 12 is operating at highest magnification, which is the initial condition. If so, tilt of the square artifact 16, referred to as the alignment reticle, is determined to a higher precision beginning at step 112 as described in more detail by the flow chart of FIG. 5. At step 114, the upper right corner of the square artifact 16 is moved to the center of the field of view as shown in FIG. 2. A sequence of steps referenced generally as block 116 provides for gathering the location of fifty points along the vertical edge 20 near the upper right corner of the test artifact 16 at twenty different stage positions straddling the center of the field of view. The data is averaged to determine an accurate position of the upper end of the vertical edge 20.

Step 118 translates the test artifact 16 vertically along the Y-axis until the lower right corner of the test artifact 16 is located at the center of the field of view. The distance translated is recorded. Step 120 provides for repeating the steps of block 116 to determine an accurate position of the lower end of the vertical edge 20. Calculations for precisely determining the tilt of the vertical edge 20 are performed at step 122 based on the horizontal displacements measured at the opposite ends of the vertical edge (i.e., the upper right and lower right corners of the square test artifact 16) and the vertical distance measured between the two ends. Similar measurements can be performed to determine the tilt of the horizontal edge 18, or if the horizontal and vertical edges 18 and 20 are known to be exactly orthogonal (as is preferred), the same inclination to the orthogonal coordinate axes X and Y can be assumed, Step 130 generates correction data based on the data acquired in the preceding steps, which includes (a) vertical lines of data representing the appearance of the vertical edge 20 within the field of view at measured horizontal displacements of the motion stage 14 along the X coordinate axis, (b) horizontal lines of data representing the appearance of the horizontal edge 18 within the field of view at measured vertical displacements of the motion stage 14 along the Y coordinate axis, and (c) a measure of the inclination of the horizontal and vertical edges 18 and 20 with respect to the X and Y coordinate axes.

A more accurate estimate of pixel size is determined by comparing the displacements of the two edges 18 and 20 recorded in pixels within the image plane 48 with the corresponding displacements of the artifact 16 recorded in distance within the object plane 44. The large amount of collected data reduces the influence of camera noise on the determination of pixel size. For measuring horizontal distortions of the digital imaging system 12, the vertical line of data closest to the center of the field of view is treated as being affected by the least distortion (i.e., best represents the true shape of the edge 20). The vertical edge data is then compensated for the measured tilt, representing how the edge 20 would appear if not tilted.

Based on the tilt compensated center line of data, the measured horizontal displacements of the artifact 16, and the estimated pixel size, new vertical lines of data are predicted, representing how the vertical edge 20 should have appeared within the field of view of the digital imaging system at the measured displacements of the artifact 16. The differences between the predicted and actual vertical lines of data are treated as measures of the horizontal distortions of the digital imaging system 12. Similar predictions can be made concerning the appearance of the horizontal edge 18 at its measured vertically displaced positions for measuring the vertical distortions of the digital imaging system 12.

For example, the preferred procedure includes determining the stage displacement of the artifact 16 between the center line of data and another measured line of data within the field of view. Considering the calculated pixel size, a simple transform predicts how the center line of data should appear within the field of view if so displaced. The difference between the measured line of data and the predicted line of data is a direct measure of the local distortions of the digital imaging system 12.

Both the measured and predicted horizontal and vertical lines of data can be represented in units of pixels within the pixel array of the digital camera 40. Each pixel has both a horizontal component and a vertical component for locating its position within a matrix of pixels. Each measured pixel is also associated with at least one of a horizontal or vertical correction value based on the difference between its actual location within the pixel array and its predicted location within the pixel array but for optical distortion of the imaging system 12. The correction values can be averaged of otherwise filtered based on the values of nearby pixels. A lookup table can be generated for storing the correction values for the given magnification.

Decision step 130 determines if the digital imaging system is operating at its lowest magnification. If not, processing continues with step 134 for acquiring new data and generating new correction values for the lower magnification. It is not necessary to re-measure tilt if the artifact 16 is not disturbed between the measurements. A similar lookup table can be generated for each different magnification. Data acquisition is complete after the correction values for the lowest magnification are recorded.

Nonlinear distortion related errors can be removed from new images intended for measurement or comparison within the computer vision system 10 by reconstructing the considered features of the image using the correction values. For example, a considered pixel having X and Y coordinates of 330 and 200 along with correction values of −10 and 5 is treated for measurement purposes as having X and Y coordinates of 320 and 205. If the considered pixel does not correspond to one of the pixels assigned with correction values, interpolation techniques can be used to calculate a correction value for the pixel based on surrounding pixels that do have assigned correction values.

Although the test artifact 16 is shown as a square, the artifact 16 can also take other shapes, but preferably includes at least one substantially straight edge and more preferably includes two orthogonal edges capable of bisecting the entire field of view at the lowest magnification. The motion stage 14 preferably supports two rectilinear axes of motion. However, additional or alternative axes of motion can also be used including a combination of rotational and translational axes. The horizontal and vertical orientations and their associated coordinate axes as used herein are intended as relative orthogonal orientations and do not limit the digital imaging system 12 and the motion stage 14 to any particular spatial orientation.

Preferably, the two axes of orthogonal translational motion supported by the motion stage 16 are exactly aligned with the X and Y coordinate axes of the video window 22. However, any departures from alignment could be measured by comparing the same point on the test artifact 16 at two physically displaced positions within the field of view effected by motions along one of the axes of motion. Assumptions are also made that the distances measured in connection with the movements of the motion stage 14 are exact. Further calibrations can be carried out to support this assumption or compensate for any known errors.

Although the invention has been described in greatest detail with respect to its preferred embodiment, the teaching of the invention can be applied generally to the quantification of non-linear field of view distortions and has particular applicability to vision systems combining a digital imaging system with a motion stage for moving test objects through the field of view. The motion stage can include one or more axes for moving the test objects or the digital imaging systems.

The invention claimed is:

1. A method of quantifying nonlinear field of view distortions in a digital imaging system comprising steps of:
   mounting a test artifact having an imageable feature in a position for undergoing relative motion with respect to a digital imaging system;
   optically imaging the imageable feature of the test artifact with the digital imaging system;
   relatively moving the imageable feature of the test artifact through a field of view of the digital imaging system;
   monitoring changes in the locations of a plurality of points along the imageable feature of the test artifact appearing within an image space of the digital imaging system;
   monitoring changes in the location of the test artifact within an object space of the digital imaging system as a measure of the relative motion imparted to the test artifact; and
   comparing changes in the monitored locations of the plurality of points along the imageable feature of the test artifact appearing in the image space with changes in the monitored location of the test artifact in the object space to quantify nonlinear field of view distortions in the digital imaging system,
   wherein the step of comparing changes includes quantifying nonlinear field of view distortions in the digital imaging system independently of exact dimensions of the test artifact.

2. The method of claim 1 in which the field of view includes a height dimension and a width dimension, the imageable feature of the test artifact is substantially as long as or longer than one of the height and width dimensions of the field of view, and the step of relatively moving the test artifact includes relatively moving the test artifact to a position at which the imageable feature of the test artifact extends substantially all the way along one of the height and width dimensions of the field of view.

3. The method of claim 2 in which the imageable feature is one of two angularly related imageable features of the test artifact, and the step of relatively moving includes: (a) relatively moving the test artifact to a position at which a first of the imageable features extends substantially all the way along one of the height and width dimensions of the field of view and (b) relatively moving the test artifact to a position at which a second of the imageable features extends substantially all the way along the other of the height and width dimensions of the field of view.

4. The method of claim 3 in which the two angularly related imageable features are formed by two edges of the test artifact.

5. The method of claim 4 in which the two edges are substantially orthogonal.

6. The method of claim 1 in which the imageable feature extends at a length and the step of relatively moving the test artifact includes relatively translating the test artifact in a direction that is substantially normal to the length of the imageable feature.

7. The method of claim 1 in which the digital imaging system includes a pixel array in the image space and the step of monitoring changes in the locations of the plurality of points along the imageable feature of the test artifact in the image space includes identifying a set of pixels in which the imageable feature is imaged at each of a series of locations of the imageable feature in the pixel array.

8. The method of claim 7 including a further step of associating the monitored changes in the location of the test artifact within the object space with each of the sets of pixels at corresponding locations of the imageable feature in the pixel array.

9. The method of claim 8 in which the step of comparing includes calculating predicted locations of the imageable feature as sets of pixels within the pixel array based on the monitored changes in the location of the test artifact within object space and comparing the sets of pixels in which the imageable feature is imaged with the calculated sets of pixels at corresponding locations of the imageable feature in object space.

10. The method of claim 1 in which the artifact feature includes a line feature and including a step of measuring the orientation of the line feature within the image space.

11. The method of claim 10 in which the line feature extends at a length and the step of relatively stepping the artifact feature includes moving the artifact feature in a direction substantially normal to the length of the line feature.

12. The method of claim 11 in which the field of view includes a height dimension and a width dimension, and the length of the line feature is substantially equal to or greater than one of the height and width directions of the field of view.

13. The method of claim 10 in which the step of measuring the orientation of the artifact feature with the image space compares locations of two different parts of the artifact feature within the field of view at a single relative position of the artifact feature within the image space.

14. The method of claim 13 in which the two parts of the artifact feature are measured at two different positions within the field of view.

15. The method of claim 10 including a step of measuring the orientation of the artifact feature within the object space compares locations of two different parts of the artifact feature within the field of view at two different relative positions of the artifact feature within the image space.

16. The method of claim 15 in which the two parts of the artifact feature are measured as substantially the same position within the field of view.

17. A system on which the method of claim 1 is carried out for quantifying nonlinear field of view distortions in a digital imaging system comprising:
   the digital imaging system including a set of optics for imaging the artifact feature within the field of view;
   a motion stage for relatively moving the artifact feature with respect to the digital imaging system;

a controller associated with the motion stage for relatively moving the artifact feature with respect to the digital imaging system through a succession of different positions;

instrumentation for measuring the relative displacement of the artifact feature with respect to the digital imaging system through the succession of different positions; and a processor that: (a) records locations of a succession of images of the artifact feature within the field of view at the succession of different relative positions of the artifact feature, (b) calculates predicted locations of the images of the artifact feature based on the measured relative displacement of the artifact feature, and (c) compares the recorded locations of the succession of images of the artifact feature within the field of view with the predicted locations of the images of the artifact feature within the field of view for determining corrections required to compensate for nonlinear field of view distortions.

18. The system of claim 17 in which artifact feature includes an imageable edge having a length capable of bisecting the field of view of the digital imaging system.

19. The system of claim 18 in which the imageable edge is a first of two angularly related imageable edges of the artifact feature.

20. The system of claim 19 in which a second of the imageable edges also has a length capable of bisecting the field of view.

21. The system of claim 20 in which the first and second edges extend perpendicular to each other.

22. The system of claim 17 in which the motion stage supports motion along two axes that provide for moving the imageable feature through an object plane of the digital imaging system.

23. The system of claim 17 in which a first of the axes of the motion stage is approximately aligned with a first edge of the artifact feature and a second of the axes of the motion stage is approximately aligned with a second edge of the artifact feature.

24. The system of claim 23 in which the controller provides for relatively moving the artifact feature with respect to the digital imaging system through a succession of different positions along the first axis of motion substantially perpendicular to the second edge of the artifact feature.

25. The system of claim 24 in which the controller provides for relatively moving the artifact feature with respect to the digital imaging system through a succession of different positions along the second axis of motion substantially perpendicular to the first edge of the artifact feature.

26. The system of claim 17 in which the digital imaging system includes a pixel array, the locations of the succession of images of the artifact feature within the field of view are identified by a sets of pixels, and the processor associates the measured the relative displacements of the artifact feature with the corresponding sets of pixels for each of the succession of different positions.

* * * * *